United States Patent [19]

Himmrich et al.

[11] Patent Number: 5,387,358
[45] Date of Patent: Feb. 7, 1995

[54] ALKALINE EARTH METAL SODIUM ACETATE, A PROCESS FOR ITS PREPARATION AND ITS USE

[75] Inventors: Johannes Himmrich, Hürth; Günther Schimmel, Erftstadt; Klaus Pöllmann, Burghausen, all of Germany

[73] Assignee: Hoechst Aktiengesellschaft, Frankfurt am Main, Germany

[21] Appl. No.: 161,776

[22] Filed: Dec. 2, 1993

[30] Foreign Application Priority Data

Dec. 17, 1992 [DE] Germany .................. 4242698

[51] Int. Cl.$^6$ ............................................. C09K 3/18
[52] U.S. Cl. ........................................ 252/70; 252/71; 562/607
[58] Field of Search .................... 252/70, 71; 106/13; 562/607

[56] References Cited

U.S. PATENT DOCUMENTS

| | | | |
|---|---|---|---|
| 4,377,488 | 3/1983 | Gancy | 252/70 |
| 4,400,285 | 8/1983 | Gancy | 252/70 |
| 4,425,251 | 1/1984 | Gancy | 252/70 |
| 4,855,071 | 8/1989 | Todd, Jr. et al. | 252/70 |
| 5,064,551 | 11/1991 | Smith | 106/13 |
| 5,219,483 | 6/1993 | Rynbrandt et al. | 106/13 |

FOREIGN PATENT DOCUMENTS

| | | | |
|---|---|---|---|
| 505746 | 9/1992 | European Pat. Off. | 562/607 |
| WO88/05456 | 7/1988 | WIPO . | |
| WO92/17557 | 10/1992 | WIPO . | |

*Primary Examiner*—Mark L. Bell
*Assistant Examiner*—C. M. Bonner
*Attorney, Agent, or Firm*—Connolly & Hutz

[57] ABSTRACT

The alkaline earth metal sodium acetate according to the invention comprises
  18 to 22% by weight of calcium ($Ca^{++}$),
  0 to 1% by weight of magnesium ($Mg^{++}$),
  4 to 7% by weight of sodium ($Na^+$),
  66 to 75% by weight of acetate ($CH_3COO^-$),
  0 to 7% by weight of water and
  0 to 2% by weight of water-insoluble components For its preparation, a calcium oxide containing at least 85% of CaO, acetic acid and sodium hydroxide solution are reacted with one another and the reaction product is granulated to give particles of 0.5 to 5 mm. The alkaline earth metal sodium acetate according to the invention can be used as an environment-friendly deicing agent causing little corrosion.

2 Claims, No Drawings

ALKALINE EARTH METAL SODIUM ACETATE, A PROCESS FOR ITS PREPARATION AND ITS USE

The present invention relates to an alkaline earth metal sodium acetate, a process for its preparation and its use as a deicing agent.

Conventional deicing agents, such as alkali metal or alkaline earth metal chlorides, each have a high thawing power and thawing rate but cause severe corrosion to metal and concrete and are classed as environmentally polluting. In contrast, urea is scarcely corrosive but unfortunately has only a low thawing power and, owing to its high nitrogen content is regarded as being highly environmentally polluting. Alkali metal acetates have a high thawing power and cause only slight metal corrosion, but they corrode concrete through the exchange of calcium for alkali metal. Finally, alkaline earth metal acetates are well tolerated by metal and concrete but, owing to their slow dissolution rate, their thawing rate is low.

U.S. Pat. No. 4,855,071 discloses a process for the preparation of a deicing agent, in which a slurry is first prepared from alkaline earth metal or alkali metal bases or mixtures thereof and water. A carboxylic acid having 1 to 4 carbon atoms is introduced into the slurry in an amount which is sufficient for complete neutralization of the bases, and water is introduced into said slurry in an amount such that the resulting slurry comprising alkaline earth metal or alkali metal carboxylates or mixtures thereof is liquid and pumpable. The carboxylate slurry heated to temperatures of about 40° to 120° C. is distributed in a thin layer on substrate particles and the coated substrate particles are finally dried.

It is the object of the present invention to provide a substance and a process for its preparation, which substance is suitable as a deicing agent having good thawing power and a high thawing rate and in addition is environmentally friendly and causes little corrosion to metal and concrete.

The substance according to the invention is an alkaline earth metal sodium acetate having the following analysis:

18 to 22% by weight of calcium ($Ca^{++}$),
0 to 1% by weight of magnesium ($Mg^{++}$),
4 to 7% by weight of sodium ($Na^+$),
66 to 75% by weight of acetate ($CH_3COO^-$),
0 to 7% by weight of water and
0 to 2% by weight of water-insoluble components The alkaline earth metal sodium acetate according to the invention exhibits the following X-ray diffraction pattern:

| d/A | Intensity | d/A | Intensity |
|---|---|---|---|
| 12.75 +− 0.2 | s | 2.39 +− 0.02 | w |
| 9.30 +− 0.1 | m | 2.29 +− 0.02 | w |
| 6.00 +− 0.08 | m | 2.23 +− 0.02 | mw |
| 4.65 +− 0.05 | w | 2.13 +− 0.02 | m |
| 3.61 +− 0.04 | w | 2.04 +− 0.02 | w |
| 3.40 +− 0.04 | vs | 1.96 +− 0.02 | mw |
| 3.28 +− 0.04 | m | 1.87 +− 0.02 | w |
| 3.12 +− 0.03 | w | 1.84 +− 0.02 | w |
| 2.88 +− 0.03 | mw | 1.80 +− 0.02 | mw |
| 2.65 +− 0.03 | w | 1.70 +− 0.02 | w |
| 2.55 +− 0.02 | w | 1.57 +− 0.02 | w | vs = very strong
s = strong
m = medium
mw = medium-weak
w = weak

Furthermore, up to 50% by weight of alkaline earth metal and/or alkali metal carboxylates having 1 to 4 carbon atoms may be admixed with the alkaline earth metal sodium acetate according to the invention.

The alkaline earth metal sodium acetate according to the invention can be prepared by reacting a calcium oxide containing at least 85% by weight of CaO, acetic acid and sodium hydroxide solution with one another and granulating the reaction product with particles of 0.5 to 5 mm, preferably 1.5 to 2.5 mm.

The process for the preparation of the alkaline earth metal sodium acetate according to the invention may furthermore alternatively be designed in such a way that a) solid calcium oxide is reacted with excess acetic acid with kneading and the reaction product containing acetic acid is further kneaded after the addition of sodium hydroxide solution;
b) solid calcium oxide is reacted with partly neutralized acetic acid with kneading;
c) a slurry obtained from calcium oxide and water is reacted with acetic acid and sodium hydroxide solution while stirring;
d) a slurry obtained from calcium oxide and water is reacted with partly neutralized acetic acid while stirring;
e) the partly neutralized acetic acid is obtained from sodium hydroxide solution and acetic acid;
f) the partly neutralized acetic acid is obtained from sodium carbonate and acetic acid;
g) acetic acid containing at least 98% by weight of $CH_3COOH$ is used;
h) sodium hydroxide solution containing at least 40% by weight of NaOH is used;
i) the solution or suspension present after the reaction is dried in a spray dryer with hot air at 150° to 400° C.;
j) the solution or suspension present after the reaction is dried with the aid of a fluidized-bed dryer with simultaneous granulation.

Finally, the alkaline earth metal sodium acetate according to the invention can be used as an environmentally friendly deicing agent causing little corrosion, it furthermore being possible for up to 50% by weight of alkaline earth metal and/or alkali metal carboxylates having 1 to 4 carbon atoms to be admixed with the alkaline earth metal sodium acetate.

The alkaline earth metal sodium acetate according to the invention has a substantially higher dissolution rate than alkaline earth metal acetates or mixtures of alkaline earth metal acetates with alkali metal acetates and is thus distinguished by a higher thawing rate when used as a deicing agent.

For the determination of the dissolution rate of deicing agents, 1 g of the substance to be evaluated is finely milled and the powder is pressed to give a pellet in a compression mold (d=16 mm) for 25 minutes under a pressure of 100 $N/cm^2$. The pellet is placed on a wire net having a wire spacing of 3 mm, and the wire net is immersed in a vessel containing 200 ml of water at 20° C. to the region of half its filling height. The time in which either the pellet has dissolved completely or its residues have fallen downward through the wire net is a measure of the dissolution rate. Accordingly, calcium magnesium acetates have a dissolution rate of more than 4 hours and calcium acetate has a dissolution rate of 20 minutes, while the alkaline earth metal alkali metal acetate according to the invention has a dissolution rate of about 2 minutes.

In the process for the preparation of alkaline earth metal sodium acetate according to the invention, a pulverulent product is obtained in the course of the kneading reaction, while a solution or suspension is obtained in the reaction of the slurry obtained from calcium oxide and water with acetic acid and sodium hydroxide solution, from which solution or suspension a pulverulent product is obtainable by crystallization or spray-drying.

In the process for the preparation of the alkaline earth metal sodium acetate according to the invention, the granulation of the pulverulent product can be carried out with small amounts of water on a turntable or by compression granulation with the aid of a roll compactor.

Finally, it is possible for the solution or suspension obtained in the reaction of the slurry obtained from calcium oxide and water with acetic acid and sodium hydroxide solution to be subjected to spray granulation (drying of the aqueous solution or suspension with simultaneous granulation with the aid of a fluidized-bed dryer).

EXAMPLE 1

In a 1 l tilting kneader having Z kneading blades (from Aachener Misch- und Knetmaschinenfabrik Peter Küpper GmbH & Co. KG), 476 g of 99.5% strength acetic acid (7.89 mol) were added to 200 g of fine white lime (about 89.3% of CaO, 3.18 mol of CaO) while kneading in a period of 25 minutes, and thoroughly kneaded for 90 minutes. Thereafter, 92 g of 50% strength sodium hydroxide solution (1.15 mol) were added to the reaction product containing acetic acid, and kneading was continued for a further 120 minutes. According to its X-ray diffraction pattern, the resulting substance comprised essentially the alkaline earth metal sodium acetate according to the invention, and its dissolution rate was 2 minutes, its 10% strength aqueous solution had a pH of 9.4 and its water-insoluble residue amounted to 2% by weight.

EXAMPLE 2

In the kneader used in Example 1, 437 g of 99.5% strength acetic acid (7.24 mol) were added to 200 g of fine white lime (about 89.3% of CaO, 3.18 mol of CaO) while kneading in a period of 20 minutes, and thoroughly kneaded for 90 minutes. Thereafter, 45 g of 50% strength sodium hydroxide solution (0.56 mol) were added to the reaction product containing acetic acid, and kneading was continued for a further 120 minutes. The resulting material consisted of 21% by weight of calcium, 0.5% by weight of magnesium, 2% by weight of sodium, 68% by weight of acetate, 6.5% by weight of water and 2% by weight of water-insoluble residue. According to its X-ray diffraction pattern, the material contained the alkaline earth metal sodium acetate according to the invention as the main component and calcium acetate as a secondary component, and its dissolution rate was 3 minutes and the pH of its 10% strength aqueous suspension was 9.7.

EXAMPLE 3

In the kneader used in Example 1, 536 g of 99.5% strength acetic acid (8.88 mol) were added to 200 g of fine white lime (about 89.3% of CaO, 3.18 mol of CaO) while kneading in a period of 25 minutes, and thoroughly kneaded for 90 minutes. Thereafter, 160 g of 50% strength sodium hydroxide solution (2.00 mol) were added to the reaction product containing acetic acid, and kneading was continued for a further 180 minutes. The resulting material consisted of 17% by weight of calcium, 0.3% by weight of magnesium, 6.2% by weight of sodium, 67.5% by weight of acetate, 7% by weight of water and 2% by weight of water-insoluble residue. According to its X-ray diffraction pattern, the material contained the alkaline earth metal sodium acetate according to the invention as the main component and sodium acetate as a secondary component, and its dissolution rate was 1.5 minutes and the pH of its 10% strength aqueous suspension was 9.6.

EXAMPLE 4

In a beaker, 476 g of 99.5% strength acetic acid (7.89 mol) were first partly neutralized with 92 g of 50% strength sodium hydroxide solution (1.15 mol). This partly neutralized acetic acid was added while kneading in a period of 25 minutes to 200 g of fine white lime (about 89.3% of CaO, 3.18 mol) which was present in the kneader used in Example 1, and kneading was then continued for 180 minutes. According to its X-ray investigation, the resulting material comprised predominantly the alkaline earth metal sodium acetate according to the invention and smaller amounts of calcium acetate and sodium acetate. 2% by weight of the material were water-insoluble, its dissolution rate was 2 minutes and its 10% strength aqueous suspension had a pH of 9.2.

EXAMPLE 5

In a beaker, 60.9 g of sodium carbonate (0.575 mol) were first added to 476 g of 99.5% strength acetic acid (7.89 mol) and stirring was carried out until no further $CO_2$ evolution was observed. Thereafter, water was added to the still cloudy reaction mixture while stirring, until a clear solution formed. The partly neutralized acetic acid prepared in this manner was reacted with 200 g of fine white lime (about 89.3% of CaO; 3.18 mol) with kneading in the kneader used in Example 1. According to its X-ray diffraction pattern, the resulting material corresponded to that from Example 4; its water-insoluble component amounted to about 2% by weight, its dissolution rate was 2 minutes and its 10% strength aqueous suspension had a pH of 9.5.

EXAMPLE 6

In a beaker, 164.4 g of sodium carbonate (0.575 mol) were first added to 476 g of 99.5% strength acetic acid (7.89 mol) and stirring was carried out until no further $CO_2$ evolution was observed and the solution was clear. This partly neutralized acetic acid was reacted with 200 g of fine white lime (about 89.3% of CaO; 3.18 mol) with kneading in the kneader used in Example 1, and kneading was then continued for a further 180 minutes. According to its X-ray diffraction pattern, the resulting material corresponded to that from Examples 4 and 5; its water-insoluble component amounted to about 2% by weight, its dissolution rate was 2 minutes and its 10% strength aqueous suspension had a pH of 9.5.

EXAMPLE 7

In a beaker, an approximately 10% strength milk of lime was prepared from 104 g of fine white lime (about 89.3% of CaO, 1.66 mol of CaO) and 862 g of water. This milk of lime was mixed with 53.3 g of 50% strength sodium hydroxide solution (0.666 mol) and neutralized with 240 g of 99.5% strength acetic acid (3.977 mol) in a period of 120 minutes while stirring. Thereafter, the approximately 25% strength alkaline earth metal sodium acetate solution prepared in this manner was filtered and was spray-dried with the aid of a laboratory spray tower (type 190 from Büchi) with hot air at 200° to 300° C. According to its X-ray investigation, the resulting material contained the alkaline earth metal sodium acetate as the main component, while calcium acetate and sodium acetate were secondary components. The material was completely soluble in water, its dissolution rate was 1 minute and its 10% strength aqueous solution had a pH of 8.3.

We claim:

1. An alkaline earth metal sodium acetate consisting essentially of
   18 to 22% by weight of calcium ($Ca^{++}$),
   0 to 1% by weight of magnesium ($Mg^{++}$),
   4 to 7% by weight of sodium ($Na^+$),
   66 to 75% by weight of acetate ($CH_3COO^-$),
   0 to 7% by weight of water;
said alkaline earth metal sodium acetate having the following X-ray diffraction pattern:

| d/A | Intensity | d/A | Intensity |
| --- | --- | --- | --- |
| 12.75 +− 0.2 | s | 2.39 +− 0.02 | w |
| 9.30 +− 0.1 | m | 2.29 +− 0.02 | w |
| 6.00 +− 0.08 | m | 2.23 +− 0.02 | mw |
| 4.65 +− 0.05 | w | 2.13 +− 0.02 | m |
| 3.61 +− 0.04 | w | 2.04 +− 0.02 | w |
| 3.40 +− 0.04 | vs | 1.96 +− 0.02 | mw |
| 3.28 +− 0.04 | m | 1.87 +− 0.02 | w |
| 3.12 +− 0.03 | w | 1.84 +− 0.02 | w |
| 2.88 +− 0.03 | mw | 1.80 +− 0.02 | mw |
| 2.65 +− 0.03 | w | 1.70 +− 0.02 | w |
| 2.55 +− 0.02 | w | 1.57 +− 0.02 | w | vs = very strong
s = strong
m = medium
mw = medium-weak
w = weak.

2. A deicing agent causing little corrosion comprising a mixture of
   a) up to 50% by weight of carboxylates having 1 to 4 carbon atoms with cations selected from alkali metals and alkaline earth metals, and
   b) an alkaline earth metal saCium acetate consisting essentially of
   18 to 22% by weight of calcium ($Ca^{++}$),
   0 to 1% by weight of magnesium ($Mg^{++}$),
   4 to 7% by weight of sodium ($Na^+$),
   66 to 75% by weight of acetate ($CH_3COO^-$),
   0 to 7% by weight of water;
said alkaline earth metal sodium acetate having the following X-ray diffraction pattern:

| d/A | Intensity | d/A | Intensity |
| --- | --- | --- | --- |
| 12.75 +− 0.2 | s | 2.39 +− 0.02 | w |
| 9.30 +− 0.1 | m | 2.29 +− 0.02 | w |
| 6.00 +− 0.08 | m | 2.23 +− 0.02 | mw |
| 4.65 +− 0.05 | w | 2.13 +− 0.02 | m |
| 3.61 +− 0.04 | w | 2.04 +− 0.02 | w |
| 3.40 +− 0.04 | vs | 1.96 +− 0.02 | mw |
| 3.28 +− 0.04 | m | 1.87 +− 0.02 | w |
| 3.12 +− 0.03 | w | 1.84 +− 0.02 | w |
| 2.88 +− 0.03 | mw | 1.80 +− 0.02 | mw |
| 2.65 +− 0.03 | w | 1.70 +− 0.02 | w |
| 2.55 +− 0.02 | w | 1.57 +− 0.02 | w | vs = very strong
s = strong
m = medium
mw = medium-weak
w = weak.

* * * * *